US011653337B2

(12) United States Patent
Wang et al.

(10) Patent No.: US 11,653,337 B2
(45) Date of Patent: May 16, 2023

(54) TIME DOMAIN RESOURCE ALLOCATION METHOD AND APPARATUS

(71) Applicant: Huawei Technologies Co., Ltd., Shenzhen (CN)

(72) Inventors: Ting Wang, Shanghai (CN); Zhe Liu, Shanghai (CN); Hao Tang, Shanghai (CN); Yi Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 105 days.

(21) Appl. No.: 17/037,251

(22) Filed: Sep. 29, 2020

(65) Prior Publication Data
US 2021/0014861 A1 Jan. 14, 2021

Related U.S. Application Data

(63) Continuation of application No. PCT/CN2019/079570, filed on Mar. 25, 2019.

(30) Foreign Application Priority Data

Apr. 4, 2018 (CN) .......................... 201810301448.5

(51) Int. Cl.
*H04W 72/04* (2009.01)
*H04W 72/0446* (2023.01)
(Continued)

(52) U.S. Cl.
CPC ....... *H04W 72/0446* (2013.01); *H04L 69/324* (2013.01); *H04W 72/1289* (2013.01)

(58) Field of Classification Search
CPC .............. H04L 69/324; H04W 72/042; H04W 72/0446; H04W 72/1289
(Continued)

(56) References Cited

U.S. PATENT DOCUMENTS 10,645,683 B2  5/2020  Xia et al.
2010/0246376 A1  9/2010  Nam et al.
(Continued)

FOREIGN PATENT DOCUMENTS

CN  103096446 A  5/2013
CN  103796327 A  5/2014
(Continued)

OTHER PUBLICATIONS

CMCC, "Discussion on remaining issues for time domain resource allocation", 3GPP TSG RAN WG1 Meeting #92, R1-1802043, Athens, Greece, Feb. 26-Mar. 2, 2018, 4 pages.
(Continued)

*Primary Examiner* — Robert J Lopata
(74) *Attorney, Agent, or Firm* — Slater Matsil, LLP

(57) ABSTRACT

Embodiments of this application disclose a time domain resource allocation method. The method may include: determining N pieces of candidate time domain resource information, where N is greater than or equal to 2; and receiving indication information, where the indication information is to be used to determine, from the N pieces of candidate time domain resource information, a time domain resource allocated to a data channel. For at least one of M frame structure parameters, a time domain resource indicated by at least one of the N pieces of candidate time domain resource information is different from a time domain resource used by at least one of the following signals and/or channels in LTE: a cell-specific reference signal (CRS), a physical downlink control channel (PDCCH), a multimedia broadcast single frequency network (MBSFN), a primary synchronization signal (PSS), a secondary synchronization signal (SSS), and/or a physical broadcast channel (PBCH).

8 Claims, 7 Drawing Sheets

(51) Int. Cl.
  *H04L 69/324* (2022.01)
  *H04W 72/12* (2023.01)
(58) Field of Classification Search
  USPC .......................................................... 370/336
  See application file for complete search history.

(56) References Cited

U.S. PATENT DOCUMENTS

| | | | |
|---|---|---|---|
| 2013/0242902 | A1 | 9/2013 | Liu et al. |
| 2019/0149365 | A1* | 5/2019 | Chatterjee ............. H04L 5/0044 370/329 |
| 2020/0120642 | A1* | 4/2020 | Hwang ................... H04L 5/005 |
| 2020/0351837 | A1* | 11/2020 | Hwang ................. H04W 72/04 |
| 2021/0014005 | A1* | 1/2021 | Ying ...................... H04L 1/1887 |
| 2021/0021315 | A1* | 1/2021 | Song ...................... H04L 5/0057 |
| 2021/0337562 | A1* | 10/2021 | Huang .............. H04W 72/1263 |
| 2021/0337563 | A1* | 10/2021 | Huang ................ H04W 72/005 |

FOREIGN PATENT DOCUMENTS

| | | |
|---|---|---|
| CN | 104981015 A | 10/2015 |
| CN | 105933981 A | 9/2016 |
| CN | 108076520 A | 5/2018 |
| EP | 2826266 A4 | 3/2015 |
| WO | 2017020199 A1 | 2/2017 |

OTHER PUBLICATIONS

Samsung, "Corrections on CA operation", 3GPP TSG RAN WG1 Meeting #92, R1-1801989, Athens, Greece, Feb. 26-Mar. 2, 2018, 9 pages.

Nokia,"draftCR to 38.214 capturing the Jan. 18 ad-hoc and RAN1#92 meeting agreements", 3GPP TSG-RAN1 Meeting #92, R1-1803555, Athens, Feb. 26-Mar. 1, 2018, total 79 pages.

3GPP TS 38.101-1 V15.0.0 (Dec. 2017), 3rd Generation Partnership Project, Technical Specification Group Radio Access Network, NR, User Equipment (UE) radio transmission and reception, Part 1: Range 1 Standalone (Release 15), total 49 pages.

3GPP TS 38.101-2 V15.0.0 (Dec. 2017), 3rd Generation Partnership Project, Technical Specification Group Radio Access Network, NR, User Equipment (UE) radio transmission and reception, Part 2: Range 2 Standalone (Release 15), total 38 pages.

3GPP TS 38.212 V15.0.0 (Dec. 2017), 3rd Generation Partnership Project, Technical Specification Group Radio Access Network, NR, Multiplexing and channel coding (Release 15), total 82 pages.

3GPP TS 38.213 V15.0.0 (Dec. 2017), 3rd Generation Partnership Project, Technical Specification Group Radio Access Network, NR, Physical layer procedures for control (Release 15), total 56 pages.

3GPP TS 38.214 V15.0.0 (Dec. 2017), 3rd Generation Partnership Project, Technical Specification Group Radio Access Network, NR, Physical layer procedures for data (Release 15), total 71 pages.

3GPP TS 38.211 V15.1.0 (Mar. 2018), 3rd Generation Partnership Project, Technical Specification Group Radio Access Network, NR, Physical channels and modulation (Release 15), total 90 pages.

Nokia et al., "Draft time domain resource allocation proposal", 3GPP TSG RAN WG1 Meeting #92, R1-1803449, Athens, Greece, Feb. 26-Mar. 2, 2018, total 3 pages.

Nokia, "[Draft] LS on time domain resource allocation", 3GPP TSG-RAN1 Meeting #92, R1-1803474, Athens, Greece, Feb. 26-Mar. 2, 2018, total 1 page.

RAN1,"LS on time domain resource allocation", 3GPP TSG-RAN1 Meeting #92, R1-1803510, Athens, Greece, Feb. 26-Mar. 2, 2018, total 1 page.

MCC Support, "Draft Report of 3GPP TSG RAN WG1 #92 v0.2.0, (Athens, Greece, Feb. 26-Mar. 2, 2018)", 3GPP TSG RAN WG1 Meeting #92bis, R1-180xxxx, Sanya, China, Apr. 16-20, 2018, total 184 pages.

* cited by examiner

TIME DOMAIN RESOURCE ALLOCATION METHOD AND APPARATUS

CROSS-REFERENCE TO RELATED APPLICATIONS

This application is a continuation of International Application No. PCT/CN2019/079570, filed on Mar. 25, 2019, which claims priority to Chinese Patent Application No. 201810301448.5, filed on Apr. 4, 2018. The disclosures of the aforementioned applications are hereby incorporated by reference in their entireties.

TECHNICAL FIELD

This application relates to the field of communications technologies, and in particular, to a time domain resource allocation method and apparatus.

BACKGROUND

In a communications system, when data is transmitted between a network device and user equipment (UE), the network device may schedule the UE, for example, may allocate a frequency domain resource and/or a time domain resource of a data channel to the UE by using control information. In 5G new radio (NR), transmission of a data channel is performed on a bandwidth part (BWP), and an occupied time domain symbol may dynamically change. For example, transmission may start from a first symbol in a slot or a subframe, or start from any other symbol, and an end symbol may also be at any location in the slot or the subframe. A specific time domain resource to be used for data transmission needs to be determined by the UE and the network device, for example, may be indicated by the network device to the UE. However, in the 5G NR, how UE determines a specific to-be-used time domain resource based on indication of a network device needs to be further researched.

SUMMARY

Embodiments of this application provide a time domain resource allocation method and apparatus, and propose a specific method for determining a time domain resource of a data channel, so that transmission performance of data transmission can be ensured by allocating a proper default candidate resource.

To achieve the foregoing objective, the embodiments of this application use the following technical solutions:

According to a first aspect, this application provides a time domain resource allocation method and apparatus.

In a possible design, the method may include: determining N pieces of candidate time domain resource information, where N is greater than or equal to 1; and receiving indication information, where the indication information is to be used to determine, from the N pieces of candidate time domain resource information, a time domain resource allocated to a data channel. For at least one of M frame structure parameters, a time domain resource indicated by at least one of the N pieces of candidate time domain resource information is different from a time domain resource used by at least one of the following signals and/or channels in long term evolution LTE: a cell-specific reference signal CRS, a physical downlink control channel PDCCH, a multimedia broadcast single frequency network MBSFN, a primary synchronization signal PSS, a secondary synchronization signal SSS, and/or a physical broadcast channel PBCH. The M frame structure parameters include at least one of the following frame structure parameters: a 30 kHz subcarrier spacing and a normal cyclic prefix CP, a 60 kHz subcarrier spacing and a normal CP, a 15 kHz subcarrier spacing and an extended CP, a 30 kHz subcarrier spacing and an extended CP, and a 60 kHz subcarrier spacing and an extended CP.

In the method, for the at least one of the M frame structure parameters, the time domain resource indicated by the at least one piece of candidate time domain resource information is different from the time domain resource used by the signal and/or the channel in LTE. In this way, interference between an NR system and an LTE system during data transmission can be avoided, and transmission performance of the data transmission is ensured.

According to a second aspect, this application provides a time domain resource allocation method and apparatus.

In a possible design, the method may include: determining N pieces of candidate time domain resource information, where N is greater than or equal to 1; and receiving indication information, where the indication information is to be used to determine, from the N pieces of candidate time domain resource information, a time domain resource allocated to a data channel. The N pieces of candidate time domain resource information include at least one of the following: a mapping type is a type B, $K_0$ is 0, S is 10, and L is 2; a mapping type is a type B, $K_0$ is 0, S is 10, and L is 4; a mapping type is a type B, $K_0$ is 0, S is 8, and L is 2; a mapping type is a type B, $K_0$ is 0, S is 8, and L is 4; a mapping type is a type B, $K_0$ is 0, S is 8, and L is 6; a mapping type is a type B, $K_0$ is 0, S is 6, and L is 2; a mapping type is a type B, $K_0$ is 0, S is 6, and L is 4; a mapping type is a type B, $K_0$ is 0, S is 6, and L is 6; a mapping type is a type B, $K_0$ is 0, S is 6, and L is 7; a mapping type is a type B, $K_0$ is 0, S is 4, and L is 2; a mapping type is a type B, $K_0$ is 0, S is 4, and L is 4; a mapping type is a type B, $K_0$ is 0, S is 4, and L is 6; or a mapping type is a type B, $K_0$ is 0, S is 4, and L is 7, where $K_0$ represents a slot offset and is used to indicate a slot in which the data channel is located, S represents a start symbol of the data channel in the slot, and L represents a symbol length.

In the method, specific content of the N pieces of candidate time domain resource information is proposed, and in the N pieces of candidate time domain resource information, for at least one of M frame structure parameters, a time domain resource indicated by at least one piece of candidate time domain resource information is different from a time domain resource used by a signal and/or a channel in LTE. In this way, interference between an NR system and an LTE system during data transmission can be avoided, and transmission performance of the data transmission is ensured.

With reference to the first aspect and the second aspect, in a possible design, when N is 1, it may be directly determined that a time domain resource indicated by the candidate time domain resource information is the time domain resource allocated to the data channel, and the indication information may not be received.

With reference to any one of the foregoing aspects, in a possible design, the N pieces of candidate time domain resource information may be determined based on at least one of the following: a frequency band for the data transmission, a search space type of a downlink control channel for scheduling the data channel, the mapping type of the data channel, a format of downlink control information for scheduling the data channel, a radio network temporary identifier RNTI used to perform cyclic redundancy check CRC scrambling on the downlink control channel that is for scheduling the data channel, a type of information transmitted on the data channel, a type of a message carrying the indication information, a scheduling mode of the data channel, and a subcarrier spacing and/or a CP length.

If the N pieces of candidate time domain resource information are determined based on at least one of the frequency band for the data transmission, the search space type of the downlink control channel for scheduling the data channel, the mapping type of the data channel, the format of the downlink control information for scheduling the data channel, the radio network temporary identifier RNTI used to perform the cyclic redundancy check CRC scrambling on the downlink control channel that is for scheduling the data channel, the type of the information transmitted on the data channel, the type of the message carrying the indication information, and the scheduling mode of the data channel, whether there is interference, in the current NR system, caused by coexistence with the LTE may be distinguished, and different candidate time domain resource information is designed, to implement a flexible resource allocation method, allocate time domain resources more precisely, and improve the data transmission performance.

If the N pieces of candidate time domain resource information are determined based on the subcarrier spacing and/or the CP length, different candidate time domain resource information may be designed for different frame structure parameters. This reduces a quantity of pieces of candidate time domain resource information in each case, and can reduce overheads of signaling carrying the indication information.

With reference to any one of the foregoing aspects, in a possible design, the N pieces of candidate time domain resource information are determined when the CRC scrambling is performed, on the downlink control channel for scheduling the data channel, by using a system information radio network temporary identifier SI-RNTI, a random access radio network temporary identifier RA-RNTI, a paging radio network temporary identifier P-RNTI, or a temporary cell radio network temporary identifier TC-RNTI; or when the CRC scrambling is not performed, on the downlink control channel for scheduling the data channel, by using a cell radio network temporary identifier C-RNTI or a configured scheduling radio network temporary identifier CS-RNTI; or when the data channel is scheduled by using downlink control information in a format 0_0 or 0_1.

Correspondingly, this application further provides a time domain resource allocation apparatus. The apparatus may implement the time domain resource allocation method according to the first aspect or the second aspect. For example, the apparatus may be user equipment or a chip applied to the user equipment, or may be another apparatus that can implement the foregoing time domain resource allocation method. The apparatus may implement the foregoing method by using software, hardware, or hardware executing corresponding software.

In a possible design, the apparatus may include a processor and a memory. The processor is configured to support the apparatus in performing a corresponding function in the method according to the first aspect and/or the second aspect. The memory is configured to: be coupled to the processor, and store a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a determining module and a receiving module. The determining module is configured to: determine N pieces of candidate time domain resource information, and determine, based on indication information from the N pieces of candidate time domain resource information, a time domain resource allocated to a data channel. The receiving module is configured to receive the indication information. The N pieces of candidate time domain resource information are the N pieces of candidate time domain resource information in the first aspect or the second aspect. For features of the N pieces of candidate time domain resource information, refer to the foregoing description. Details are not described herein again.

According to a third aspect, this application provides a time domain resource allocation method and apparatus.

In a possible design, the method may include: determining N pieces of candidate time domain resource information, where N is greater than or equal to 1; and sending indication information, where the indication information is to be used to indicate, from the N pieces of candidate time domain resource information, a time domain resource allocated to a data channel. For at least one of M frame structure parameters, a time domain resource indicated by at least one of the N pieces of candidate time domain resource information is different from a time domain resource used by at least one of the following signals and/or channels in long term evolution LTE: a cell-specific reference signal CRS, a physical downlink control channel PDCCH, a multimedia broadcast single frequency network MBSFN, a primary synchronization signal PSS, a secondary synchronization signal SSS, and/or a physical broadcast channel PBCH. The M frame structure parameters include at least one of the following frame structure parameters: a 30 kHz subcarrier spacing and a normal cyclic prefix CP, a 60 kHz subcarrier spacing and a normal CP, a 15 kHz subcarrier spacing and an extended CP, a 30 kHz subcarrier spacing and an extended CP, and a 60 kHz subcarrier spacing and an extended CP.

In the method, for the at least one of the M frame structure parameters, the time domain resource indicated by the at least one piece of candidate time domain resource information is different from the time domain resource used by the signal and/or the channel in LTE. In this way, interference between an NR system and an LTE system during data transmission can be avoided, and transmission performance of the data transmission is ensured.

According to a fourth aspect, this application provides a time domain resource allocation method and apparatus.

In a possible design, the method may include: determining N pieces of candidate time domain resource information, where N is greater than or equal to 1; and sending indication information, where the indication information is to be used to indicate, from the N pieces of candidate time domain resource information, a time domain resource allocated to a data channel. The N pieces of candidate time domain resource information include at least one of the following: a mapping type is a type B, $K_0$ is 0, S is 10, and L is 2; a mapping type is a type B, $K_0$ is 0, S is 10, and L is 4; a mapping type is a type B, $K_0$ is 0, S is 8, and L is 2; a mapping type is a type B, $K_0$ is 0, S is 8, and L is 4; a mapping type is a type B, $K_0$ is 0, S is 8, and L is 6; a mapping type is a type B, $K_0$ is 0, S is 6, and L is 2; a mapping type is a type B, $K_0$ is 0, S is 6, and L is 4; a mapping type is a type B, $K_0$ is 0, S is 6, and L is 6; a mapping type is a type B, $K_0$ is 0, S is 6, and L is 7; a mapping type is a type B, $K_0$ is 0, S is 4, and L is 2; a mapping type is a type B, $K_0$ is 0, S is 4, and L is 4; a mapping type is a type B, $K_0$ is 0, S is 4, and L is 6; or a mapping type is a type B, $K_0$ is 0, S is 4, and L is 7, where $K_0$ represents a slot offset and is used to indicate a slot in which the data channel is located, S represents a start symbol of the data channel in the slot, and L represents a symbol length of the data channel in the slot.

In the method, specific content of the N pieces of candidate time domain resource information is proposed, and in the N pieces of candidate time domain resource information, for at least one of M frame structure parameters, a time domain resource indicated by at least one piece of candidate time domain resource information is different from a time domain resource used by a signal and/or a channel in LTE. In this way, interference between an NR system and an LTE system during data transmission can be avoided, and transmission performance of the data transmission is ensured.

With reference to the third aspect and the fourth aspect, in a possible design, when N is 1, it may be directly determined that a time domain resource indicated by the candidate time domain resource information is the time domain resource allocated to the data channel, and the indication information may not be sent.

With reference to the third aspect and the fourth aspect, in a possible design, the N pieces of candidate time domain resource information may be determined based on at least one of the following: a frequency band for the data transmission, a search space type of a downlink control channel for scheduling the data channel, the mapping type of the data channel, a format of downlink control information for scheduling the data channel, a radio network temporary identifier RNTI used to perform cyclic redundancy check CRC scrambling on the downlink control channel that is for scheduling the data channel, a type of information transmitted on the data channel, a type of a message carrying the indication information, a scheduling mode of the data channel, and a subcarrier spacing and/or a CP length.

If the N pieces of candidate time domain resource information are determined based on at least one of the frequency band for the data transmission, the search space type of the downlink control channel for scheduling the data channel, the mapping type of the data channel, the format of the downlink control information for scheduling the data channel, the radio network temporary identifier RNTI used to perform the cyclic redundancy check CRC scrambling on the downlink control channel that is for scheduling the data channel, the type of the information transmitted on the data channel, the type of the message carrying the indication information, and the scheduling mode of the data channel, whether there is interference, in the current NR system, caused by coexistence with the LTE may be distinguished, and different candidate time domain resource information is designed, to implement a flexible resource allocation method, allocate time domain resources more precisely, and improve the data transmission performance.

If the N pieces of candidate time domain resource information are determined based on the subcarrier spacing and/or the CP length, different candidate time domain resource information may be designed for different frame structure parameters. This reduces a quantity of pieces of candidate time domain resource information in each case, and can reduce overheads of signaling carrying the indication information.

With reference to the third aspect and the fourth aspect, in a possible design, the N pieces of candidate time domain resource information are determined when the CRC scrambling is performed, on the downlink control channel for scheduling the data channel, by using a system information radio network temporary identifier SI-RNTI, a random access radio network temporary identifier RA-RNTI, a paging radio network temporary identifier P-RNTI, or a temporary cell radio network temporary identifier TC-RNTI; or when the CRC scrambling is not performed, on the downlink control channel for scheduling the data channel, by using a cell radio network temporary identifier C-RNTI or a configured scheduling radio network temporary identifier CS-RNTI; or when the data channel is scheduled by using downlink control information in a format 0_0 or 0_1.

Correspondingly, this application further provides an apparatus. The apparatus may implement the time domain resource allocation method according to the third aspect or the fourth aspect. For example, the apparatus may be a network device or a chip system applied to the network device, or may be another apparatus that can implement the foregoing time domain resource allocation method. The apparatus may implement the foregoing method by using software, hardware, or hardware executing corresponding software.

In a possible design, the apparatus may include a processor and a memory. The processor is configured to support the apparatus in performing a corresponding function in the method according to the third aspect and/or the fourth aspect. The memory is coupled to the processor, and stores a program instruction and data that are necessary for the apparatus. In addition, the apparatus may further include a communications interface, configured to support communication between the apparatus and another apparatus. The communications interface may be a circuit, a component, an interface, a bus, a software module, a transceiver, or any other apparatus that can implement communication.

In a possible design, the apparatus may include a determining module and a sending module. The determining module is configured to: determine N pieces of candidate time domain resource information, and determine an indication information. The indication information is to be used to indicate, from the N pieces of candidate time domain resource information, a time domain resource allocated to a data channel. The sending module is configured to send the indication information. The N pieces of candidate time domain resource information are the N pieces of candidate time domain resource information in the third aspect or the fourth aspect. For features of the N pieces of candidate time domain resource information, refer to the foregoing description. Details are not described herein again.

This application further provides a computer-readable storage medium. The computer-readable storage medium stores an instruction, and when the instruction is run on a computer, the computer is enabled to perform the method according to any one of the foregoing aspects.

This application further provides a computer program product including an instruction. When the computer program product is run on a computer, the computer is enabled to perform the method according to any one of the foregoing aspects.

This application further provides a chip system. The chip system includes a processor, and may further include a memory, to implement the method according to any one of the foregoing aspects.

This application provides a communications system. The communications system includes the apparatus that is configured to implement the time domain resource allocation method according to the first aspect or the second aspect, and the apparatus that is configured to implement the time domain resource allocation method according to the third aspect or the fourth aspect.

Any apparatus, computer storage medium, or computer program product provided above is configured to perform the corresponding method provided above. Therefore, for beneficial effects that can be achieved by the apparatus, computer storage medium, or computer program product, refer to beneficial effects of a corresponding solution in the corresponding method provided above. Details are not described herein again.

DETAILED DESCRIPTION OF ILLUSTRATIVE EMBODIMENTS

The following describes in detail a time domain resource allocation method and apparatus provided in embodiments of this application with reference to the accompanying drawings.

Technical solutions provided in this application may be applied to various communications systems in a system coexistence scenario, for example, a current 2G, 3G, 4G communications system, a 5G NR system, a future evolved system, or a plurality of converged communications systems. There may be a plurality of application scenarios, and the application scenarios may include scenarios such as machine to machine (M2M), D2M, macro-micro communication, enhanced mobile broadband (eMBB), ultra-reliable and low-latency communication (uRLLC), and massive machine type communication (mMTC). These scenarios may include but are not limited to: a scenario of communication between UEs, a scenario of communication between network devices, a scenario of communication between a network device and UE, and the like. Alternatively, the technical solutions provided in the embodiments of this application may be applied to a scenario of communication between UEs, a scenario of communication between network devices, or the like in a 5G communications system.

Figure 1:
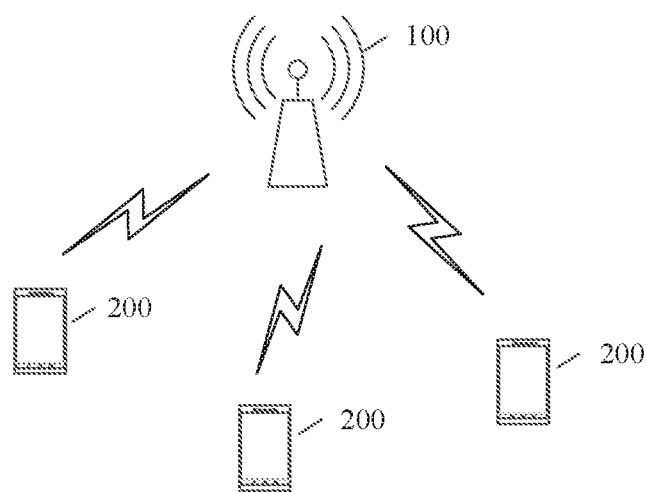
FIG. 1 is a first schematic diagram of a system architecture applicable to a technical solution according to an embodiment of this application.

The technical solutions provided in the embodiments of this application may be applied to a system architecture shown in FIG. 1. The system architecture may include a network device 100 and one or more UEs 200 connected to the network device 100.

The network device 100 may be a device that can communicate with the UE 200. The network device 100 may be a relay station, an access point, or the like. The network device 100 may be a network device transceiver station (base transceiver station, BTS) in a global system for mobile communications (GSM) or a code division multiple access (CDMA) network, or may be an NB (NodeB) in wideband code division multiple access (WCDMA), or may be an eNB or an eNodeB (evolved NodeB) in LTE. Alternatively, the network device 100 may be a radio controller in a cloud radio access network (CRAN) scenario. Alternatively, the network device 100 may be a network device in a 5G network or a network device in a future evolved PLMN network, or may be a wearable device, a vehicle-mounted device, or the like.

The UE 200 may be an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future evolved PLMN network, or the like.

It should be noted that the system architecture shown in FIG. 1 is merely used as an example, and is not intended to limit the technical solutions of this application. A person skilled in the art should understand that, in a specific implementation process, the system architecture may further include another device, and quantities of network devices 100 and UEs 200 may be configured based on a specific requirement.

The time domain resource allocation method and apparatus provided in the embodiments of this application may be applied to user equipment, and the user equipment includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, in the embodiments of this application, a specific structure of an execution body of the time domain resource allocation method is not particularly limited in the embodiments of this application, provided that a program that records code of the time domain resource allocation method in the embodiments of this application can be run to perform communication according to the time domain resource allocation method in the embodiments of this application. For example, the execution body of the time domain resource allocation method provided in the embodiments of this application may be user equipment, or a function module, in the user equipment, that can invoke the program and execute the program, or a time domain resource allocation apparatus, for example, a chip, applied to the user equipment. This is not limited in this application.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

Figure 2:
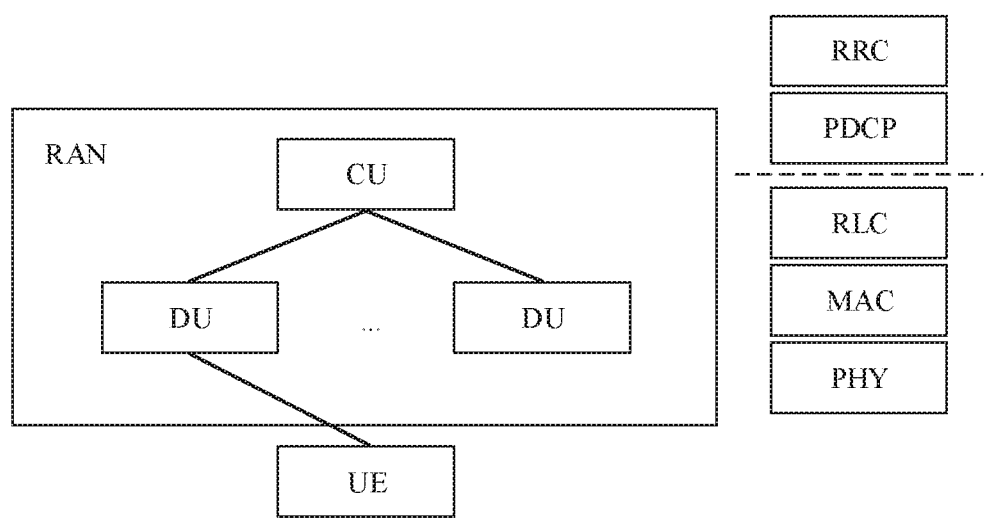
FIG. 2 is a second schematic diagram of a system architecture applicable to a technical solution according to an embodiment of this application.

A future access network may be implemented by using a cloud radio access network (C-RAN) architecture. Therefore, in a possible manner, a protocol stack architecture and a function of a conventional base station are divided into two parts: One part is referred to as a central unit (CU), and the other part is referred to as a distributed unit (DU). An actual deployment manner of the CU and the DU is relatively flexible. For example, CU parts of a plurality of base stations are integrated to form a function entity with a relatively large scale. FIG. 2 is a schematic diagram of a network architecture according to an embodiment of this application. As shown in FIG. 2, the network architecture includes an access network (where a radio access network (RAN) is used as an example) device and user equipment UE. The RAN device includes a baseband apparatus and a radio frequency apparatus. The baseband apparatus may be implemented by using one node, or may be implemented by using a plurality of nodes. The radio frequency apparatus may be independently implemented remotely from the baseband apparatus, or may be integrated into the baseband apparatus, or some remote parts of the radio frequency apparatus are integrated into the baseband apparatus. For example, in an LTE communications system, a RAN device (eNB) includes a baseband apparatus and a radio frequency apparatus. The radio frequency apparatus may be remotely arranged relative to the baseband apparatus (for example, a radio remote unit (RRU) is remotely arranged relative to a baseband unit (BBU)). The RAN device is implemented by one node, and the node is configured to implement functions of protocol layers such as a radio resource control (RRC) layer, a packet data convergence protocol (PDCP) layer, a radio link control (RLC) layer, and a media access control (MAC) layer. For another example, in an evolved structure, a baseband apparatus may include a central unit (CU) and a distributed unit (DU), and a plurality of DUs may be centrally controlled by one CU. As shown in FIG. 2, the CU and the DU may be obtained through division based on a protocol layer of a wireless network. For example, functions of a packet data convergence protocol layer and a protocol layer above the packet data convergence protocol layer are set on the CU, and functions of protocol layers below the PDCP layer, for example, a radio link control (RLC) layer and a media access control layer, are set on the DU.

The division that is based on the protocol layer is merely an example, and division may alternatively be performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. Alternatively, division may alternatively be performed in another manner, for example, based on a latency. A function whose processing time needs to meet a latency requirement is set on the DU, and a function whose processing time does not need to meet the latency requirement is set on the CU.

In addition, the radio frequency apparatus may not be placed in the DU but is placed remotely from the DU, or may be integrated into the DU, or some remote parts of the radio frequency apparatus are integrated into the DU. This is not limited herein.

Figure 3:
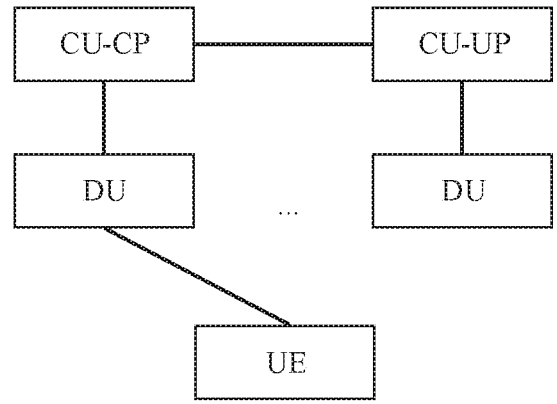
FIG. 3 is a third schematic diagram of a system architecture applicable to a technical solution according to an embodiment of this application.

In addition, still refer to FIG. 3. Compared with the architecture shown in FIG. 2, a control plane (CP) and a user plane (UP) of a CU may be further separated and implemented by dividing the CU into different entities. The entities are separately a control plane CU entity (CU-CP entity) and a user plane CU entity (CU-UP entity).

In the foregoing network architecture, signaling/data generated by the CU may be sent to UE through a DU, or signaling/data generated by the UE may be sent to the CU through the DU. The DU may transparently transmit the signaling/data to the UE or the CU by directly encapsulating the signaling/data at a protocol layer without parsing the signaling/data. In the following embodiments, if transmission of such signaling/data between the DU and the UE is involved, sending or receiving of the signaling/data by the DU includes this scenario. For example, signaling at an RRC layer or a PDCP layer is finally processed as signaling/data at a physical layer (PHY) and sent to the UE, or is converted from received signaling/data at the PHY layer. In this architecture, it may also be considered that the signaling/data at the RRC layer or the PDCP layer is sent by the DU, or is sent by the DU and a radio frequency.

In the foregoing embodiment, the CU is classified as a network device in a RAN. In addition, the CU may alternatively be classified as a network device in a core network. This is not limited herein.

An apparatus in the following embodiments of this application may be located in UE or a network device based on a function implemented by the apparatus. When the foregoing CU-DU structure is used, the network device may be a CU node, a DU node, or a RAN device including functions of a CU node and a DU node.

In this application, the time domain resource allocation method may be performed by a network device and UE, or may be performed by apparatuses applied to the network device and the UE, for example, chips, or may be performed by another apparatus for implementing the time domain resource allocation method. This is not limited in the embodiments of this application. In this specification, an example in which a network device and UE perform the foregoing time domain resource allocation method is used for description.

In NR, candidate time domain resources (for example, a slot, and a start location and/or a length of a symbol) of a data channel may be configured for the UE in a semi-static indication manner, and then one of the candidate time domain resources is configured, for the UE based on indication information, as a time domain resource of the data channel of the UE. However, if the UE does not obtain the candidate time domain resources, even if the UE receives the indication information, the UE cannot determine the specific time domain resource, and consequently, the UE cannot perform data transmission with the network device through the data channel.

For example, the network device configures the candidate time domain resources of the data channel for the UE by using radio resource control (RRC) signaling. Therefore, before the network device establishes an RRC connection to the UE, the UE cannot obtain the candidate time domain resources.

In addition, if the data channel is scheduled by using DCI in fallback mode, for example, downlink control information in a format (DCI format) 0_0 and/or DCI in a format 1_0; when cyclic redundancy check (CRC) scrambling is performed, on a downlink control channel for scheduling the data channel, by using a system information radio network temporary identifier (system information-RNTI, SI-RNTI), a random access radio network temporary identifier (random access-RNTI, RA-RNTI), a paging radio network temporary identifier (paging-RNTI, P-RNTI), or a temporary cell radio network temporary identifier (temporary C-RNTI, TC-RNTI); when CRC scrambling is not performed, on a downlink control channel for scheduling the data channel, by using a cell radio network temporary identifier (C-RNTI) or a configured scheduling radio network temporary identifier (CS-RNTI); or for a random access message Msg3 transmission situation, the UE cannot obtain the candidate time domain resources. In this case, if the UE needs to receive, through a downlink data channel from the network device, a paging message, a system message, or data scheduled by the downlink control information (DCI) in fallback mode, because the UE cannot determine a time domain resource location of the downlink data channel, the UE cannot receive the paging message, the system message, or the like sent by the network device.

For a scenario in which the UE cannot learn of the candidate time domain resources in the semi-static indication manner or the like, a design of preconfiguring default candidate time domain resources is proposed in NR. When the UE cannot obtain the candidate time domain resources configured in the semi-static indication manner, the UE may use the default candidate time domain resources.

According to the time domain resource allocation method provided in this application, a default candidate time domain resource is designed. The UE determines, from the default candidate time domain resources by using the indication information delivered by the network device, the time domain resource allocated to the data channel.

The data transmission may include downlink data transmission and uplink data transmission. The downlink data transmission may refer to that the network device sends data to the UE, and the uplink data transmission may refer to that the UE sends data to the network device. Data channels are classified into a physical downlink shared channel (PDSCH) and a physical uplink shared channel (PUSCH). The downlink data transmission is used as an example. The network device sends DCI to the UE through a physical downlink control channel (PDCCH); the UE detects the PDCCH in a control resource set (CORESET) based on a configured detection periodicity or detection moment, to obtain indication information in the DCI; and the UE may determine, from the default candidate time domain resources based on the indication information, a time domain resource allocated to a PDSCH. A method for determining a time domain resource of a PUSCH is similar to that of the PDSCH. In the embodiments of this application, the PDSCH is used as an example for description.

The following explains and describes some terms in this application, to help a reader have a better understanding.

1. Candidate Time Domain Resource Information

The candidate time domain resource information is used to indicate a default candidate time domain resource. One piece of candidate time domain resource information indicates one candidate time domain resource. Optionally, one piece of candidate time domain resource information may include four parameters: $K_0$, S, L, and a mapping type of a data channel. One candidate time domain resource may be determined based on the four parameters: $K_0$, S, L, and the mapping type of the data channel.

$K_0$ represents a slot offset and is used to indicate a slot in which the data channel is located, and a specific formula for calculating the slot in which the data channel is located is as follows:

$$\left\lfloor n \cdot \frac{2^{\mu_{PDSCH}}}{2^{\mu_{PDCCH}}} \right\rfloor + K_0$$

n is a slot in which scheduling DCI is located, and $K_0$ is a specific value of the slot offset, for example, may be 0, 1, 2, . . . , or 7. $\mu_{PDCCH}$ is a frame structure parameter of a control channel, $\mu_{PDSCH}$ is a frame structure parameter of the data channel, and $K_0$ is based on the frame structure parameter of the data channel.

For example, if a subcarrier spacing of the control channel is 15 kHz, that is, $\mu_{PDCCH}$ is 0; a subcarrier spacing of the data channel is 30 kHz, that is, $\mu_{PDSCH}$ is 1; n is 1, to be specific, the slot in which the scheduling DCI is located is a slot 1; and $K_0$ is 1, the slot in which the data channel is located is $$\left\lfloor 1 \cdot \frac{2^1}{2^0} \right\rfloor + 1,$$

namely, a slot 3.

S represents a start symbol of the data channel in the slot, and L represents a symbol length of the data channel in the slot.

A mapping type of a PDSCH may be a type A or a type B, and is used to indicate a location to which a demodulation reference signal (DMRS) is mapped.

Optionally, the mapping type of the data channel may be a mapping type of a downlink data channel, or may be a mapping type of an uplink data channel. For example, the mapping type of the data channel may be the mapping type of the PDSCH or a mapping type of a PUSCH. The mapping type of the data channel may also be referred to as a mapping type for short.

2. Frame Structure Parameter

In NR, with evolution of technologies, different frame structure parameters may be used for different frequency bands of one carrier. The frame structure parameter is referred to as a numerology in standard discussion. Different numerologies may be used for different frequency bands, that is, different frame structures are used. For example, the different frame structure parameters may be different subcarrier spacings (15 kHz, 30 kHz, and 60 kHz), and/or different cyclic prefix (CP) lengths (normal CP and extended CP), and/or different time units (1 ms, 0.5 ms, and 0.25 ms). The frame structure parameter may be at least one of a subcarrier spacing, a CP length, and a time unit.

3. The term "a plurality of" in this specification means two or more. In this specification, the terms "first" and "second" are intended to distinguish between different objects but do not describe a particular order of the objects. The term "and/or" in this specification describes only an association relationship for describing associated objects and represents that three relationships may exist. For example, A and/or B may represent the following three cases: Only A exists, both A and B exist, and only B exists.

In the embodiments of this application, the word "exemplary", "for example", or the like is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary", "for example", or the like is intended to present a relative concept in a specific manner.

Figure 4:
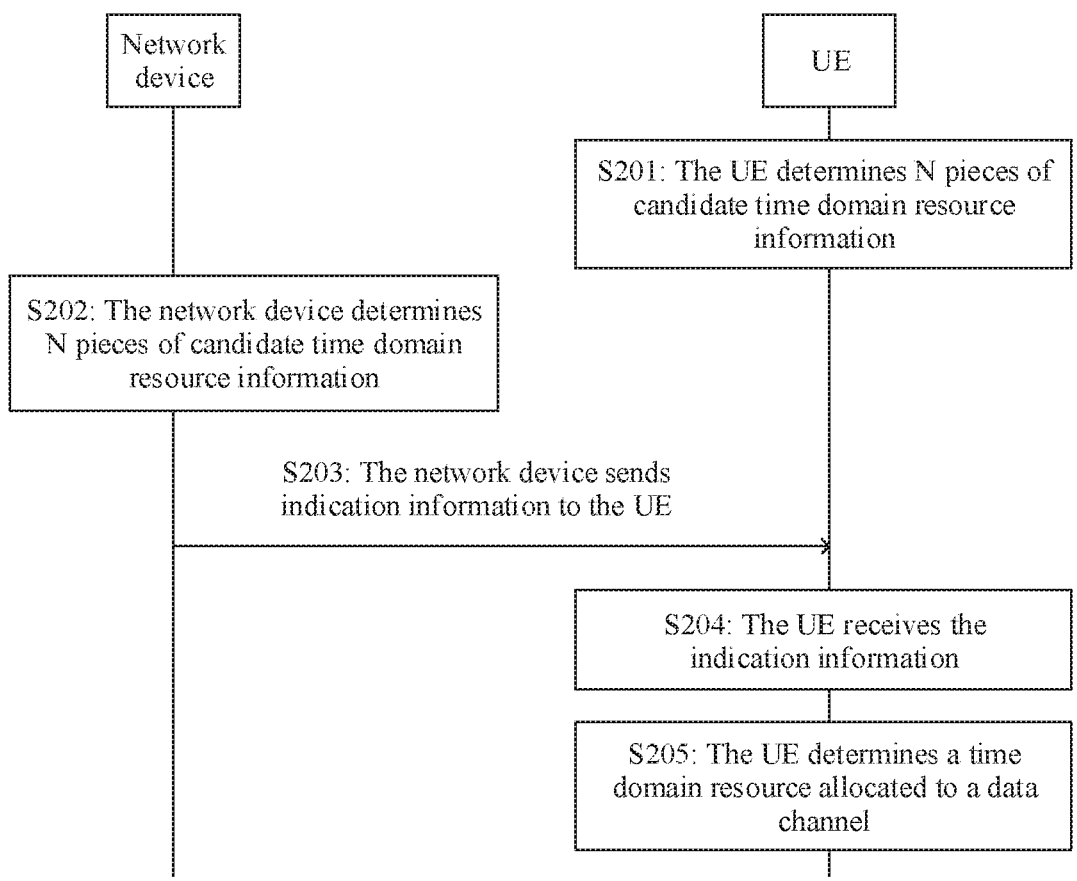
FIG. 4 is a schematic diagram of a time domain resource allocation method according to an embodiment of this application.

An embodiment of this application provides a time domain resource allocation method, which may be applied to the communications systems shown in FIG. 1 to FIG. 3. As shown in FIG. 4, the method may include S201 to S205.

S201: UE determines N pieces of candidate time domain resource information.

Specifically, the UE determines the N pieces of candidate time domain resource information, where N is greater than or equal to 1. One piece of candidate time domain resource information in the N pieces of candidate time domain resource information is used to indicate one time domain resource.

Optionally, in an implementation, the N pieces of candidate time domain resource information may be preconfigured on a UE side. For example, the N pieces of candidate time domain resource information may be predefined in a protocol. The UE and a network device may determine the N pieces of candidate time domain resource information based on the protocol.

Optionally, in an implementation, the N pieces of candidate time domain resource information may be sent by the network device to the UE. For example, the network device sends the N pieces of candidate time domain resource information to the UE by using signaling. The signaling may be system information or broadcast information, or may be higher layer signaling such as RRC signaling or media access control (MAC) signaling, or may be physical layer signaling such as DCI.

Specifically, time domain resource(s) indicated by the N pieces of candidate time domain resource information may be used for data transmission in NR, and a time domain resource indicated by at least one of the N pieces of candidate time domain resource information is different from a time domain resource used by a signal and/or a channel in LTE. In other words, the time domain resource indicated by the at least one of the N pieces of candidate time domain resource information does not include the time domain resource used by the signal and/or the channel in LTE. For example, on a time domain resource used by a cell-specific reference signal (CRS), a physical downlink control channel (PDCCH), a multimedia broadcast single frequency network (MBSFN) subframe, a primary synchronization signal (PSS), a secondary synchronization signal (SSS), and/or a broadcast channel (physical broadcast channel, PBCH) in LTE, the data transmission is not performed in NR. In this way, in a scenario in which an LTE system and an NR system coexist, interference between the LTE system and the NR system can be avoided.

The following describes the N pieces of candidate time domain resource information in the NR system by using the CRS in LTE as an example. It should be noted that only the CRS is used as an example for description herein. A person skilled in the art may understand that an occupation principle of a time domain resource used by the PDCCH, MBSFN, PSS, SSS, or PBCH is similar to that of the CRS, and is not enumerated one by one in this embodiment of this application. However, it should not be considered that content of the occupation principle goes beyond the scope of this application. The candidate time domain resource information in the NR system is designed based on a time domain resource feature, and only one of the CRS, PDCCH, MBSFN, PSS, SSS, and PBCH in LTE may be considered, or a plurality of signals and/or channels in LTE may be considered. For example, for some slots used to send the CRS signal in the LTE system, only the CRS is considered when the candidate time domain resource information in the NR system is designed. For example, for some other slots that may be used to send the CRS and/or the PDCCH signal in the LTE system, both the CRS and the PDCCH are considered when the candidate time domain resource information in the NR system is designed.

Figure 5A:
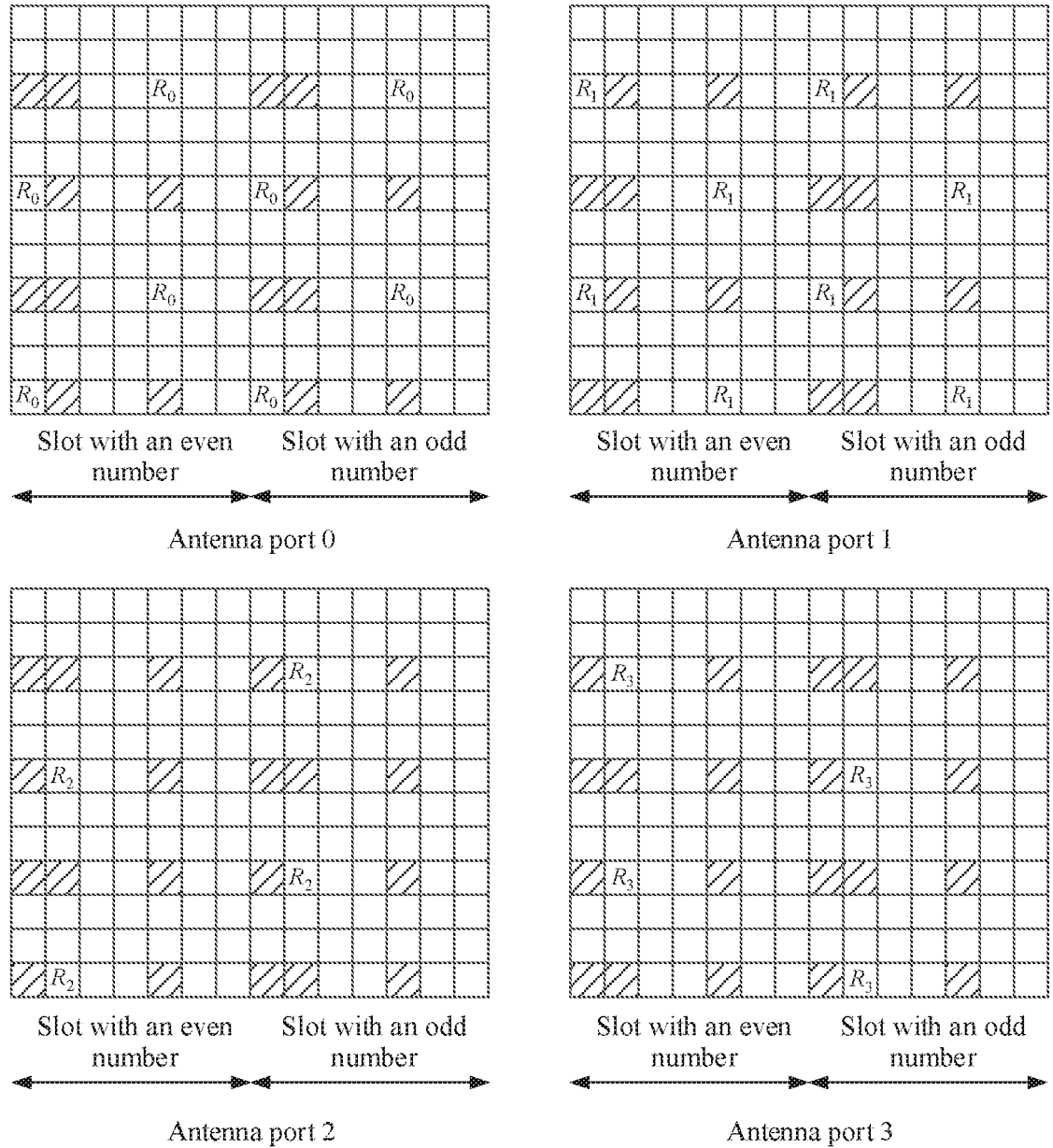
FIG. 5a is a first schematic diagram of a pattern of resource elements occupied by CRSs in LTE.
Figure 5B:
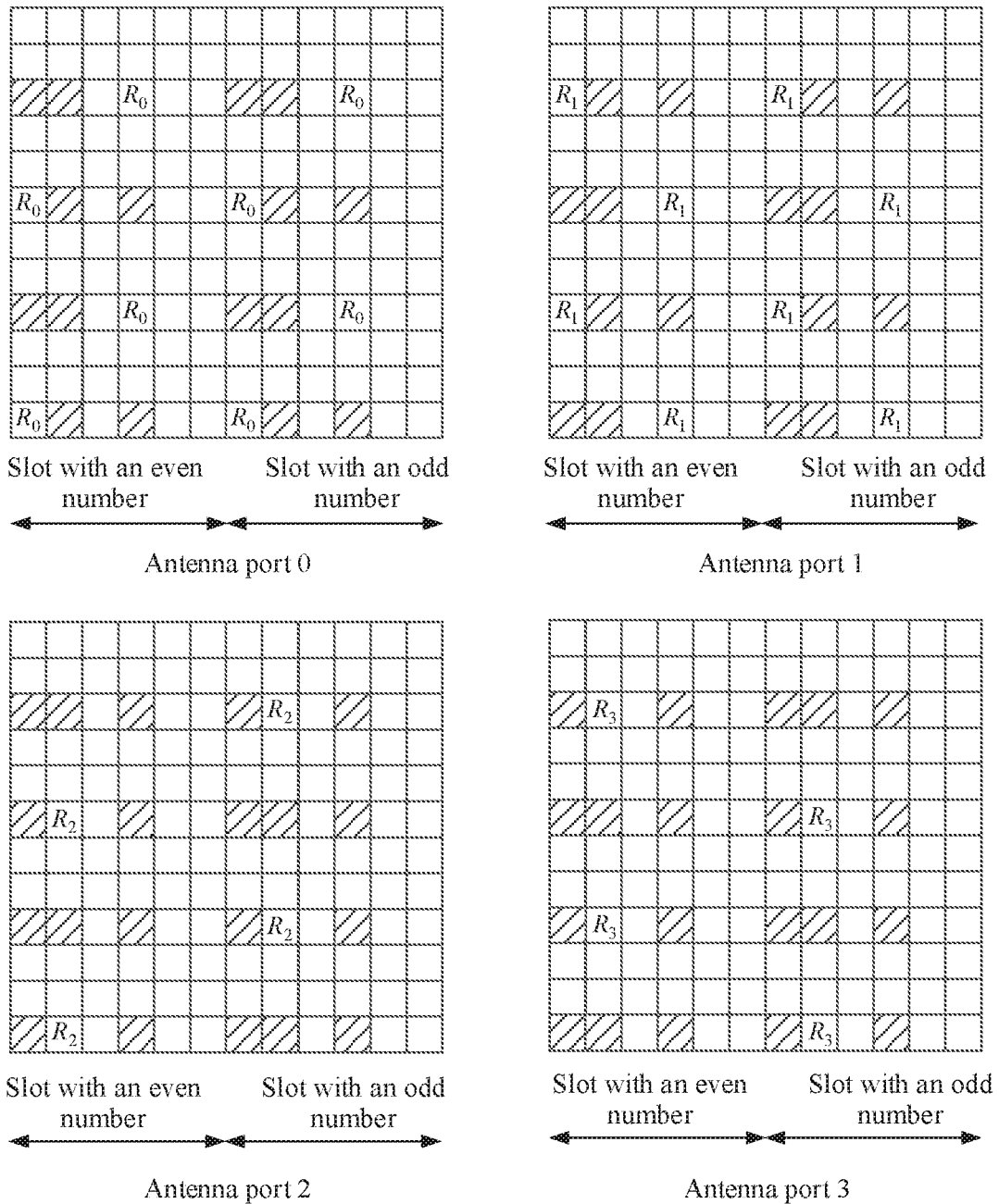
FIG. 5b is a second schematic diagram of a pattern of resource elements occupied by CRSs in LTE.

FIG. 5a shows a pattern of resource elements (RE), occupied by CRSs on four antenna ports, in LTE for a normal CP. An RE occupied on an antenna port 0 is marked as $R_0$, an RE occupied on an antenna port 1 is marked as $R_1$, an RE occupied on an antenna port 2 is marked as $R_2$, and an RE occupied on an antenna port 3 is marked as $R_3$. FIG. 5b shows a pattern of REs, occupied by CRSs on four antenna ports, in LTE for an extended CP. An RE occupied on an antenna port 0 is marked as $R_0$, an RE occupied on an antenna port 1 is marked as $R_1$, an RE occupied on an antenna port 2 is marked as $R_2$, and an RE occupied on an antenna port 3 is marked as $R_3$. In LTE, a subcarrier spacing is 15 kHz; one subframe has a length of 1 ms and may include two slots; and for a normal CP, each slot has seven symbols, and symbol numbers may be $\{0, 1, 2, \ldots, 6\}$; or for an extended CP, each slot has six symbols, and symbol numbers may be $\{0, 1, 2, \ldots, 5\}$. As shown in FIG. 5a, for the normal CP, symbols occupied by CRSs in a slot are symbols #0, #1, and #4. As shown in FIG. 5b, for the extended CP, symbols occupied by CRSs in a slot are symbols #0, #1, and #3.

Optionally, in another communications system, definitions of a subframe, a slot, and a symbol may be different. In this application, only an example, in NR, in which one subframe has a length of 1 ms and one slot includes 14 or 12 symbols is used for description. This application is also applicable to the another communications system. Specific definitions of a subframe, a slot, and a symbol are not limited in this application.

Figure 6A:
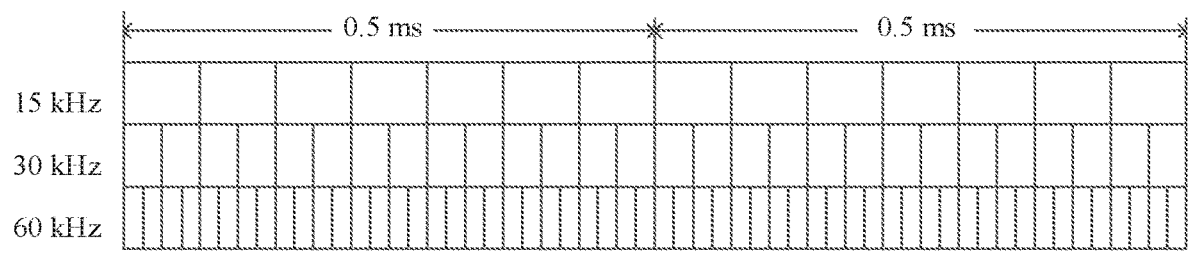
FIG. 6a is a schematic diagram of symbols of a subframe in NR.

In NR, for a normal CP, one slot may include 14 symbols, and symbol numbers may be $\{0, 1, 2, \ldots, 13\}$; for an extended CP, one slot includes 12 symbols, and symbol numbers may be $\{0, 1, 2, \ldots, 11\}$. Frame structure parameters supported in NR include: a 15 kHz subcarrier spacing and a normal CP, a 30 kHz subcarrier spacing and a normal CP, a 60 kHz subcarrier spacing and a normal CP, a 15 kHz subcarrier spacing and an extended CP, a 30 kHz subcarrier spacing and an extended CP, and a 60 kHz subcarrier spacing and an extended CP, or may be another combination of a subcarrier spacing and a CP. FIG. 6a is a schematic diagram of symbols, of a subframe with a length of 1 ms in NR, for a normal CP at different subcarrier spacings (15 kHz, 30 kHz, and 60 kHz). One box represents one symbol.

For example, for a normal CP, symbols in NR that are corresponding to REs occupied by CRSs in LTE are separately (1) Symbols at a subcarrier spacing of 15 kHz are symbols #0, #1, #4, #7, #8, and #11;

2) Symbols at a subcarrier spacing of 30 kHz are symbols #0, #1, #2, #3, #8, and #9; and 3) Symbols at a subcarrier spacing of 60 kHz are symbols #0, #1, #2, #3, #4, #5, #6, and #7 of a slot with an even number and symbols #2, #3, #4, and #5 of a slot with an odd number.

Figure 6B:
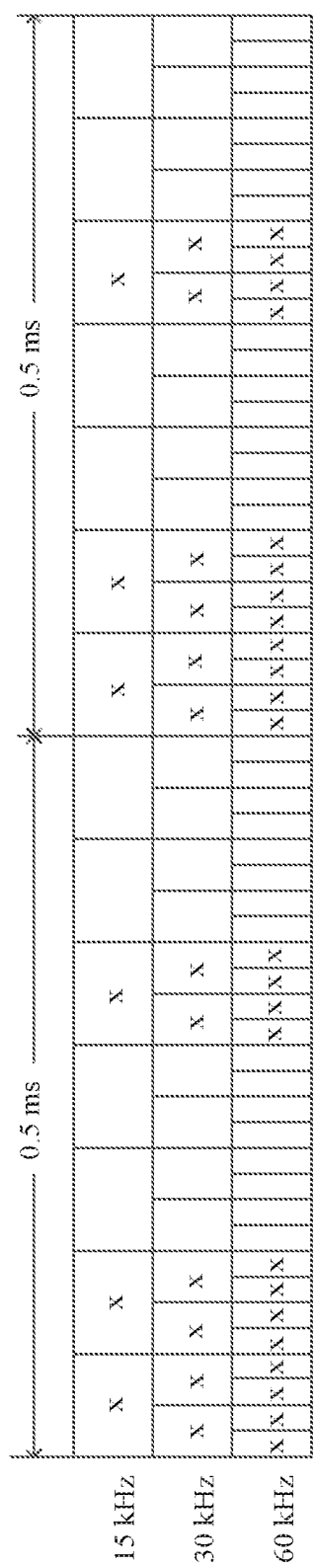
FIG. 6b is a schematic diagram of symbol locations in NR corresponding to resource elements occupied by CRSs in LTE.

As shown in FIG. 6b, locations marked as x are locations, of symbols in NR that are corresponding to REs occupied by CRSs in LTE, for a normal CP at different subcarrier spacings (15 kHz, 30 kHz, and 60 kHz).

In addition, for an extended CP, symbols in NR that are corresponding to REs occupied by CRSs in LTE at a subcarrier spacing of 60 kHz are:

symbols #0, #1, #2, #3, #4, #5, #6, and #7 of a slot with an even number and symbols #0, #1, #2, and #3 of a slot with an odd number.

Based on the foregoing analysis, an available time domain resource in NR may be a time domain resource that is not occupied by a CRS in LTE. The available time domain resource in NR may be represented as a candidate time domain resource. Table 1 shows candidate time domain resource information for different frame structure parameters (including different subcarrier spacings and/or CP lengths). One row in Table 1 is one piece of candidate time domain resource information. The N pieces of candidate time domain resource information may be at least one in Table 1.

TABLE 1

| i | Mapping type | $K_0$ | S | L |
|---|---|---|---|---|
| 0 | Type B | 0 | 10 | 2 |
| 1 | Type B | 0 | 10 | 4 |
| 2 | Type B | 0 | 8 | 2 |
| 3 | Type B | 0 | 8 | 4 |
| 4 | Type B | 0 | 8 | 6 |
| 5 | Type B | 0 | 6 | 2 |
| 6 | Type B | 0 | 6 | 4 |
| 7 | Type B | 0 | 6 | 6 |
| 8 | Type B | 0 | 6 | 7 |
| 9 | Type B | 0 | 4 | 2 |
| 10 | Type B | 0 | 4 | 4 |
| 11 | Type B | 0 | 4 | 6 |
| 12 | Type B | 0 | 4 | 7 | i is only an identifier of a row in the table, and arrangement of the candidate time domain resource information in the table may alternatively be another case. For example, a value of i corresponding to one piece of candidate time domain resource information (which may include a mapping type, $K_0$, S, and L) may alternatively be another case. This is not limited in this embodiment of this application.

In this application, an example in which a value of $K_0$ is 0 is used for description, or $K_0$ may be another value, for example, may be a positive integer such as 1 or 2. This is not limited in this application.

Optionally, the candidate time domain resource information may alternatively be shown in Table 2. The candidate time domain resource information not only includes candidate time domain resource information designed when an LNC scenario (where the LNC scenario is a scenario in which an LTE system and an NR system coexist) is considered, but also may include candidate time domain resource information designed when the LNC scenario is not considered. The N pieces of candidate time domain resource information may be at least one in Table 2.

TABLE 2

| i | Mapping type | $K_0$ | S | L |
|---|---|---|---|---|
| 0 | Type B | 0 | 2 | 2 |
| 1 | Type A | 0 | 2 | 4 |
| 2 | Type A | 0 | 2 | 7 |
| 3 | Type A | 0 | 2 | 12 |
| 4 | Type B | 0 | 4 | 2 |
| 5 | Type B | 0 | 4 | 4 |
| 6 | Type B | 0 | 4 | 7 |
| 7 | Type B | 0 | 5 | 2 |
| 8 | Type B | 0 | 6 | 2 |
| 9 | Type B | 0 | 6 | 4 |
| 10 | Type B | 0 | 6 | 7 |
| 11 | Type B | 0 | 8 | 2 |
| 12 | Type B | 0 | 8 | 4 |
| 13 | Type B | 0 | 9 | 2 |
| 14 | Type B | 0 | 10 | 2 |
| 15 | Type B | 0 | 10 | 4 |

Optionally, after the candidate time domain resource information is determined, a time domain resource allocated to a data channel may be determined based on indication information sent by the network device. For example, the indication information may be a bit, and a meaning of the bit may be corresponding to candidate time domain resource information. The time domain resource allocated to the data channel may be determined based on the candidate time domain resource information indicated by the indication information, and data transmission is performed based on the time domain resource.

Specifically, for example, if the predefined candidate time domain resource information is the candidate time domain resource information in Table 2, the network device and the UE may determine that the candidate time domain resource information is that shown in Table 2, and determine a bit of the indication information. For example, in Table 2, 16 pieces of candidate time domain resource information (16 rows) are included, and each needs to be indicated by using four bits. For example, bits 0000 represent a first row, bits 0001 represent a second row, and so on. Other candidate time domain resource information may be similar to the candidate time domain resource information in Table 2. Details are not described herein.

The candidate time domain resource information shown in Table 1 may include information for different frame structure parameters. Optionally, the UE may alternatively determine different candidate time domain resource information based on different frame structure parameters.

Optionally, the candidate time domain resource information may be determined based on a CP length.

Specifically, the CP length may be a CP length in a frame structure parameter corresponding to the data channel, or may be a CP length in a frame structure parameter corresponding to a downlink control channel for scheduling the data channel, or may be a CP length in a frame structure parameter corresponding to a BWP in which the data channel is located, or may be a CP length in a frame structure parameter corresponding to a BWP in which a downlink control channel for scheduling the data channel is located.

For example, different candidate time domain resource information may be designed for different CP lengths. For example, for a normal CP, the candidate time domain resource information is shown in Table 3. For an extended CP, the candidate time domain resource information is shown in Table 4. The N pieces of candidate time domain resource information may be at least one in Table 3 or Table 4.

TABLE 3

| i | Mapping type | $K_0$ | S | L |
|---|---|---|---|---|
| 0 | Type B | 0 | 10 | 2 |
| 1 | Type B | 0 | 10 | 4 |
| 2 | Type B | 0 | 8 | 2 |
| 3 | Type B | 0 | 8 | 4 |
| 4 | Type B | 0 | 6 | 2 |
| 5 | Type B | 0 | 6 | 4 |
| 6 | Type B | 0 | 6 | 7 |
| 7 | Type B | 0 | 4 | 2 |
| 8 | Type B | 0 | 4 | 4 |
| 9 | Type B | 0 | 4 | 7 |

TABLE 4

| i | Mapping type | $K_0$ | S | L |
|---|---|---|---|---|
| 0 | Type B | 0 | 10 | 2 |
| 1 | Type B | 0 | 10 | 4 |
| 2 | Type B | 0 | 8 | 2 |
| 3 | Type B | 0 | 8 | 4 |
| 4 | Type B | 0 | 8 | 6 |
| 5 | Type B | 0 | 6 | 2 |
| 6 | Type B | 0 | 6 | 4 |
| 7 | Type B | 0 | 6 | 6 |
| 8 | Type B | 0 | 4 | 2 |
| 9 | Type B | 0 | 4 | 4 |
| 10 | Type B | 0 | 4 | 6 |

In Table 3 and Table 4, i is only an identifier of a row in the tables, and arrangement of the candidate time domain resource information in the tables may alternatively be another case. For example, a value of i corresponding to one piece of candidate time domain resource information (which may include a mapping type, $K_0$, S, and L) may alternatively be another case. This is not limited in this embodiment of this application.

In this application, an example in which a value of $K_0$ is 0 is used for description, or $K_0$ may be another value, for example, may be a positive integer such as 1 or 2. This is not limited in this application.

Optionally, the candidate time domain resource information may be determined based on a subcarrier spacing.

Specifically, the subcarrier spacing may be a subcarrier spacing in a frame structure parameter corresponding to the data channel, or may be a subcarrier spacing in a frame structure parameter corresponding to a downlink control channel for scheduling the data channel, or may be a subcarrier spacing in a frame structure parameter corresponding to a BWP in which the data channel is located, or may be a subcarrier spacing in a frame structure parameter corresponding to a BWP in which a downlink control channel for scheduling the data channel is located.

Optionally, the candidate time domain resource information may be determined based on a subcarrier spacing and a CP length.

Specifically, the subcarrier spacing and the CP length may be a subcarrier spacing and a CP length in a frame structure parameter corresponding to the data channel, or may be a subcarrier spacing and a CP length in a frame structure parameter corresponding to a downlink control channel for scheduling the data channel, or may be a subcarrier spacing and a CP length in a frame structure parameter corresponding to a BWP in which the data channel is located, or may be a subcarrier spacing and a CP length in a frame structure parameter corresponding to a BWP in which a downlink control channel for scheduling the data channel is located.

For example, different candidate time domain resource information may be designed for different subcarrier spacings.

For example, for a subcarrier spacing of 15 kHz and for a normal CP, the candidate time domain resource information is shown in Table 5; for a subcarrier spacing of 30 kHz and for a normal CP, the candidate time domain resource information is shown in Table 6; for a subcarrier spacing of 60 kHz and for a normal CP, the candidate time domain resource information is shown in Table 7; for a subcarrier spacing of 60 kHz and for an extended CP, the candidate time domain resource information is shown in Table 8. Optionally, candidate time domain resource information for the normal CP at the subcarrier spacing of 60 kHz and candidate time domain resource information for the extended CP at the subcarrier spacing of 60 kHz are combined and used as the candidate time domain resource information. And candidate time domain resource information at the subcarrier spacing of 60 kHz is shown in Table 9. The N pieces of candidate time domain resource information may be at least one in Table 5 to Table 9.

In Table 5 to Table 9, i is only an identifier of a row in the tables, and arrangement of the candidate time domain resource information in the tables may alternatively be another case. For example, a value of i corresponding to one piece of candidate time domain resource information (which may include a mapping type, $K_0$, S, and L) may alternatively be another case. This is not limited in this embodiment of this application.

In this application, an example in which a value of $K_0$ is 0 is used for description, or $K_0$ may be another value, for example, may be a positive integer such as 1 or 2. This is not limited in this application.

TABLE 5

| i | Mapping type | $K_0$ | S | L |
|---|---|---|---|---|
| 0 | Type B | 0 | 5 | 2 |
| 1 | Type B | 0 | 9 | 2 |
| 2 | Type B | 0 | 12 | 2 |

TABLE 6

| i | Mapping type | $K_0$ | S | L |
|---|---|---|---|---|
| 0 | Type B | 0 | 4 | 2 |
| 1 | Type B | 0 | 6 | 2 |
| 2 | Type B | 0 | 10 | 2 |
| 3 | Type B | 0 | 4 | 4 |
| 4 | Type B | 0 | 10 | 4 |

TABLE 7

| i | Mapping type | $K_0$ | S | L |
|---|---|---|---|---|
| 0 | Type B | 0 | 6 | 2 |
| 1 | Type B | 0 | 8 | 2 |
| 2 | Type B | 0 | 10 | 2 |
| 3 | Type B | 0 | 12 | 2 |
| 4 | Type B | 0 | 6 | 4 |
| 5 | Type B | 0 | 8 | 4 |
| 6 | Type B | 0 | 10 | 4 |

TABLE 8

| i | Mapping type | $K_0$ | S | L |
|---|---|---|---|---|
| 0 | Type B | 0 | 4 | 2 |
| 1 | Type B | 0 | 6 | 2 |
| 2 | Type B | 0 | 8 | 2 |
| 3 | Type B | 0 | 10 | 2 |
| 4 | Type B | 0 | 4 | 4 |
| 5 | Type B | 0 | 6 | 4 |
| 6 | Type B | 0 | 8 | 4 |
| 7 | Type B | 0 | 4 | 6 |
| 8 | Type B | 0 | 6 | 6 |

TABLE 9

| i | Mapping type | $K_0$ | S | L |
|---|---|---|---|---|
| 0 | Type B | 0 | 4 | 2 |
| 1 | Type B | 0 | 6 | 2 |
| 2 | Type B | 0 | 8 | 2 |
| 3 | Type B | 0 | 10 | 2 |
| 4 | Type B | 0 | 10 | 4 |
| 5 | Type B | 0 | 4 | 4 |
| 6 | Type B | 0 | 6 | 4 |
| 7 | Type B | 0 | 8 | 4 |
| 8 | Type B | 0 | 10 | 4 |
| 9 | Type B | 0 | 4 | 6 |
| 10 | Type B | 0 | 6 | 6 |

In a manner of Table 1 and Table 2, different frame structure parameters may correspond to a same group of candidate time domain resource information. In a manner of Table 3 to Table 9, different frame structure parameters may correspond to different candidate time domain resource information. In the two manners, for the manner in which different frame structure parameters correspond to a same group of candidate time domain resource information, a design is simple and implementation complexity of the network device and the UE is relatively low. For the manner in which different frame structure parameters correspond to different candidate time domain resource information, a quantity of pieces of candidate time domain resource information included in the N pieces of candidate time domain resource information determined by the UE is small, so that signaling overheads can be reduced. During specific implementation, whether different frame structure parameters use a same group of candidate time domain resource information or use different candidate time domain resource information may be determined based on a requirement. This is not limited in this embodiment of this application.

A specific to-be-used manner may be preconfigured, or may be sent by the network device to the UE by using signaling. The signaling may be system information or broadcast information, or may be higher layer signaling such as RRC signaling or MAC signaling, or may be physical layer signaling such as DCI.

Optionally, the CP length may be preconfigured, or may be sent by the network device to the UE by using signaling. The signaling may be system information or broadcast information, or may be higher layer signaling such as RRC signaling or MAC signaling, or may be physical layer signaling such as DCI.

Optionally, when determining the candidate time domain resource information, the UE may further determine a current scenario based on a time-frequency resource occupied for current data transmission, and the like. For example, an LNC scenario and a non-LNC scenario may be included. The LNC scenario is a scenario in which an LTE system and an NR system coexist. In the LNC scenario, for a candidate time domain resource used for data transmission in NR, a case in which a signal in the LTE system occupies the time domain resource needs to be considered. It should be noted that the UE may determine the candidate time domain resource information based on the current scenario, or may determine the candidate time domain resource information with reference to the current scenario and a method in at least one of other embodiments of this application. This is not limited in this application.

The UE may determine the candidate time domain resource information based on a scenario.

Specifically, for example, if the LNC scenario is considered, first candidate time domain resource information is used. If the LNC scenario is not considered, second candidate time domain resource information is used. The first candidate time domain resource information may be the candidate time domain resource information designed in this application, and the second candidate time domain resource information may be candidate time domain resource information designed when the LNC scenario is not considered.

Optionally, different candidate time domain resource information may be determined for different scenarios. Certainly, based on an actual situation, same candidate time domain resource information may also be used in different scenarios.

Optionally, the UE may determine the candidate time domain resource information based on at least one of the following: a frequency band for the data transmission, a search space type of the downlink control channel for scheduling data, the mapping type of the data channel, a format of downlink control information for scheduling the data, a radio network temporary identifier (RNTI) used to perform cyclic redundancy check (CRC) scrambling on the downlink control channel that is for scheduling the data, a type of information transmitted on the data channel, a type of a message carrying the indication information, and a scheduling mode of the data channel.

For different content of at least one of the foregoing pieces of information, different candidate time domain resource information may be determined. The candidate time domain resource information may be designed when requirements in different information cases are considered, so that data resource allocation can be performed more properly. In addition, a time domain resource allocation requirement in each case may also be met when overheads are reduced.

Optionally, the candidate time domain resource information may be determined based on at least one of the following implementations.

In an implementation, the UE determines the candidate time domain resource information based on the frequency band for the data transmission.

Optionally, the UE may determine different candidate time domain resource information for different frequency bands for the data transmission.

Specifically, for example, an NR system and an LTE system perform data transmission in a 1.8 G frequency band at the same time, and therefore, an LNC scenario is considered in the 1.8 G frequency band, and the first candidate time domain resource information is used. For another frequency band, for example, an NR system and an LTE system do not perform data transmission in a 2.6 G frequency band at the same time, and therefore, an LNC scenario is not considered, and the second time domain resource information is used.

In an implementation, the UE determines the candidate time domain resource information based on the search space type of the downlink control channel for scheduling the data.

Optionally, the UE may determine different candidate time domain resource information for different search space types.

Specifically, for example, the search space types may include a common search space and a user-level search space. The common search space includes at least one of a Type0-PDCCH common search space, a Type0A-PDCCH common search space, a Type1-PDCCH common search space, a Type2-PDCCH common search space, and a Type3-PDCCH common search space. Specifically, for example, for data transmission scheduled by the Type0-PDCCH common search space and the Type0A-PDCCH common search space, a special candidate time domain resource may be designed. For the Type1-PDCCH common search space, the Type2-PDCCH common search space, and the Type3-PDCCH common search space, the first candidate time domain resource information is used. For the user-level search space, the second candidate time domain resource information may be used.

In an implementation, the UE determines the candidate time domain resource information based on the format of the downlink control information for scheduling the data.

A downlink control channel PDCCH is used to transmit downlink control information DCI, and the DCI may be used to schedule uplink data and may also be used to schedule downlink data.

Optionally, different candidate time domain resource information may be determined for different formats of downlink control information for scheduling data.

Specifically, for example, downlink control information for scheduling different data may have different DCI formats. For example, uplink data may be scheduled by using downlink control information in a DCI format 0_0 or a DCI format 0_1, and downlink data may be scheduled by using downlink control information in a DCI format 1_0 or a DCI format 1_1.

Specifically, for example, for data scheduled by using the downlink control information in the DCI format 0_0 or the DCI format 1_0, the UE may determine that the candidate time domain resource information is the first candidate time domain resource information. For data scheduled by using the downlink control information in the DCI format 0_1 or the DCI format 1_1, the UE may determine that the candidate time domain resource information is the second candidate time domain resource information.

In an implementation, the UE determines the candidate time domain resource information based on the RNTI used to perform the CRC scrambling on the downlink control channel that is for scheduling the data.

Optionally, the UE may determine different candidate time domain resource information for different RNTIs used to perform the CRC scrambling on the downlink control channel for scheduling the data.

Specifically, for example, the network device allocates RNTIs to the UE for different data. When downlink control channel transmission is performed, a CRC of a downlink control channel is scrambled by using an RNTI. Different candidate time domain resource information may be determined for different RNTIs used to perform CRC scrambling on downlink control channels.

For example, a CRC of a downlink control channel for scheduling data of system information is scrambled by using an SI-RNTI (system information-RNTI, system information-radio network temporary identifier).

For example, a CRC of a downlink control channel for scheduling data of paging information is scrambled by using a P-RNTI (paging-RNTI, paging-radio network temporary identifier).

For example, a CRC of a downlink control channel for scheduling data of random access information is scrambled by using a RA-RNTI (random access-RNTI, random access-radio network temporary identifier).

For example, a CRC of a downlink control channel for scheduling data of a random access process is scrambled by using a TC-RNTI (temporary cell-RNTI, temporary cell-radio network temporary identifier).

For example, a CRC of a downlink control channel for scheduling user-specific data is scrambled by using a C-RNTI (cell-RNTI, cell-radio network temporary identifier).

For example, a CRC of a downlink control channel for scheduling configured scheduling data is scrambled by using a CS-RNTI (configured scheduling-RNTI, configured scheduling-radio network temporary identifier).

For example, if the RNTI used to perform the CRC scrambling on the downlink control channel that is for scheduling the data is the SI-RNTI, the P-RNTI, the RA-RNTI, or the TC-RNTI, the first candidate time domain resource information is used; if the RNTI used to perform the CRC scrambling on the downlink control channel that is for scheduling the data is the C-RNTI or the CS-RNTI, the second candidate time domain resource information is used.

In an implementation, the UE determines the candidate time domain resource information based on the mapping type of the data channel.

Optionally, different candidate time domain resource information is determined for different mapping types of the data channel.

Specifically, for example, for a type B, the first candidate time domain resource information may be used; for a type A, the second candidate time domain resource information or specially designed candidate time domain resource information may be used.

In an implementation, the UE determines the candidate time domain resource information based on the type of the information transmitted on the data channel.

Optionally, different candidate time domain resource information is determined for different types of information transmitted on the data channel.

Optionally, the type of the information transmitted on the data channel may be at least one of system information, paging information, random access information (for example, a random access response or an Msg3), data transmitted with a configured grant, user-specific data, or cell-level data.

Specifically, for example, the network device may send the data channel to the UE, and the type of the information transmitted on the data channel may be remaining minimum system information (RMSI), user data scheduled by using DCI in fallback mode, or a random access message Msg3. Different candidate time domain resource information may be determined for the RMSI, the user data scheduled by using the DCI in fallback mode, or the Msg3 transmitted on the data channel. For example, for data transmission of the RMSI, special candidate time domain resource information for the RMSI may be designed; for data transmission of the user data scheduled by using the DCI in fallback mode, the first candidate time domain resource information is used; for data transmission of the Msg3, special candidate time domain resource information for the Msg3 may be designed.

In an implementation, the UE determines the candidate time domain resource information based on the type of the message carrying the indication information.

Optionally, different candidate time domain resource information is determined for different types of messages carrying the indication information.

Optionally, the type of the message carrying the indication information may be at least one of system information, higher layer signaling, and physical layer signaling.

Specifically, for example, the network device may send remaining minimum system information (RMSI), DCI in fallback mode, or higher layer signaling carrying the indication information to the UE. When the RMSI, the DCI in fallback mode, or the higher layer signaling carries the indication information, different candidate time domain resource information may be determined. For example, for data transmission of the RMSI carrying the indication information, special candidate time domain resource information for the RMSI may be designed; for data transmission of the DCI, in fallback mode, carrying the indication information, the first candidate time domain resource information is used; for data transmission of the higher layer signaling carrying the indication information, special candidate time domain resource information for the higher layer signaling may be designed.

In an implementation, the UE determines the candidate time domain resource information based on the scheduling mode of the data channel.

Optionally, different candidate time domain resource information is determined for different scheduling modes of the data channel.

Specifically, for example, the scheduling modes of the data channel includes: slot-based scheduling or non-slot-based scheduling. For the non-slot-based scheduling, the first candidate time domain resource information may be used; for the slot-based scheduling, the second candidate time domain resource information may be used.

S202: The network device determines N pieces of candidate time domain resource information.

Specifically, the network device determines the N pieces of candidate time domain resource information, and N is greater than or equal to 1. One piece of candidate time domain resource information in the N pieces of candidate time domain resource information is used to indicate one time domain resource.

Optionally, in an implementation, the N pieces of candidate time domain resource information may be preconfigured on a network device side. For example, the N pieces of candidate time domain resource information may be predefined in the protocol. The UE and the network device may determine the N pieces of candidate time domain resource information based on the protocol.

Optionally, in an implementation, the network device determines the N pieces of candidate time domain resource information, and then sends the N pieces of candidate time domain resource information to the UE. For example, the network device sends the N pieces of candidate time domain resource information to the UE by using signaling. The signaling may be system information or broadcast information, or may be higher layer signaling such as RRC signaling or media access control (MAC) signaling, or may be physical layer signaling such as DCI.

A principle and a method for determining the N pieces of candidate time domain resource information by the network device are the same as the principle and the method for determining the N pieces of candidate time domain resource information by the UE. Details are not described herein again.

It should be noted that an execution sequence of S201 and S202 is not limited in this application.

S203: The network device sends the indication information to the UE.

Specifically, the network device sends the indication information to the UE, where the indication information is to be used to determine, from the N pieces of candidate time domain resource information, the time domain resource allocated to the data channel. Optionally, the indication information may be carried in system information or broadcast information, or may be carried in higher layer signaling such as RRC signaling or media access control (MAC) signaling, or may be carried in physical layer signaling such as DCI.

For example, the indication information may be a bit in the DCI, and is used to indicate a piece of the N pieces of candidate time domain resource information.

Optionally, a quantity of bits of the indication information may be determined based on a quantity of pieces of candidate time domain resource information. Specifically, for example, if the quantity of pieces of candidate time domain resource information is N, the quantity of bits of the indication information may be N or a value obtained after $\log_2^N$ is rounded up.

S204: The UE receives the indication information.

S205: The UE determines the time domain resource allocated to the data channel.

Specifically, after receiving the indication information, the UE may determine the time domain resource allocated to the data channel based on the determined N pieces of candidate time domain resource information.

Optionally, the data channel may be an uplink data channel or a downlink data channel. To be specific, the time domain resource allocation method in this application may be applied to an uplink data channel such as a PUSCH, or may be applied to a downlink data channel such as a PDSCH, or may be applied to transmission on another data channel. This is not limited in this application.

For example, the UE determines that the N pieces of candidate time domain resource information are shown in Table 1. When bits in the DCI are 0010, the time domain resource allocated to the data channel is a time domain resource determined based on that $K_0=0$, $S=8$, $L=2$, and the mapping type is the type B.

For example, the UE determines that the N pieces of candidate time domain resource information are shown in Table 6. When bits in the DCI are 010, the time domain resource allocated to the data channel is a time domain resource determined based on that $K_0=0$, $S=10$, $L=2$, and the mapping type is the type B.

It should be noted that, if in S201, the UE determines that N for the N pieces of candidate time domain resource information is 1, that is, there is only one piece of candidate time domain resource information, the UE may not determine the time domain resource allocated to the data channel based on the indication information sent by the network device, but may directly determine the time domain resource allocated to the data channel based on the candidate time domain resource information. In this case, the network device also determines that N for the N pieces of candidate time domain resource information is 1, and may not send the indication information to the UE. The network device and the UE may determine, based on an actual situation, whether to send the indication information. This is not limited in this embodiment of this application.

In the time domain resource allocation method provided in this embodiment of this application, the candidate time domain resource information in the NR system is designed for a frame structure parameter, the time domain resource indicated by the at least one piece of candidate time domain resource information is different from the time domain resource used by the signal and/or the channel in LTE, and the time domain resource allocated to the data channel is determined from the N pieces of candidate time domain resource information by using the indication information. Data transmission is performed by using the time domain resource determined according to the time domain resource allocation method provided in the embodiments of this application, so that the interference between the LTE system and the NR system can be reduced, and transmission performance of the data transmission is ensured.

The foregoing mainly describes the solutions provided in the embodiments of this application from a perspective of interaction between a network device and user equipment. It may be understood that, to implement the foregoing functions, the network device and the user equipment each include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the user equipment may be divided into function modules based on the foregoing method examples. For example, each function module may be obtained through a division based on each corresponding function, or two or more functions may be integrated into one processing module. The integrated module may be implemented in a form of hardware, or may be implemented in a form of a software function module. It should be noted that, in the embodiments of this application, module division is an example, and is merely logical function division. During actual implementation, another division manner may be used. The following uses an example in which each function module is obtained through division based on each corresponding function for description.

Figure 7:
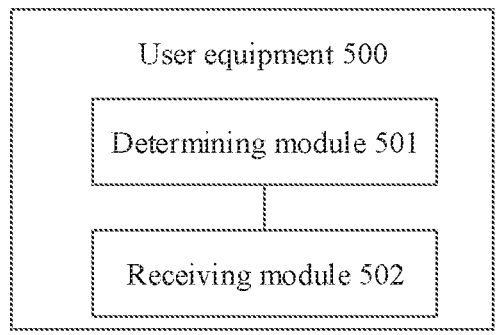
FIG. 7 is a schematic structural diagram of user equipment according to an embodiment of this application.

FIG. 7 is a schematic diagram of a logical structure of an apparatus 500 according to an embodiment of this application. The apparatus 500 may be user equipment, and can implement a function of the user equipment in the method provided in the embodiments of this application. The apparatus 500 may alternatively be an apparatus that can support user equipment in implementing a function of the user equipment in the method provided in the embodiments of this application. The apparatus 500 may be a hardware structure, a software module, or a combination of the hardware structure and the software module. The apparatus 500 may be implemented by using a chip system. In this embodiment of this application, the chip system may include a chip, or may include a chip and another discrete component. As shown in FIG. 7, the apparatus 500 includes a determining module 501 and a receiving module 502. The determining module 501 may be configured to: perform S201 and S205 in FIG. 4, and/or perform another step described in this application. The receiving module 502 may be configured to: perform S204 in FIG. 4, and/or perform another step described in this application. The determining module may also be referred to as a determining unit or another name, and the receiving module may also be referred to as a receiving unit or another name.

All related content of the steps in the foregoing method embodiment may be cited in function descriptions of corresponding function modules. Details are not described herein again.

Figure 8:
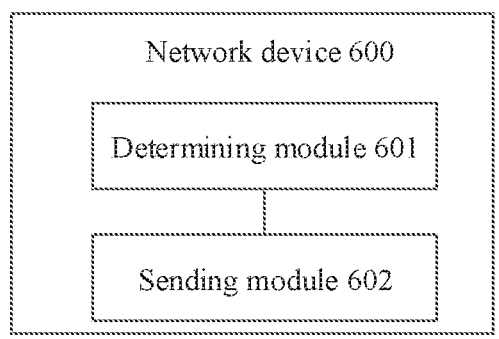
FIG. 8 is a schematic structural diagram of a network device according to an embodiment of this application.

FIG. 8 is a schematic diagram of a logical structure of an apparatus 600 according to an embodiment of this application. The apparatus 600 may be a network device, and can implement a function of the network device in the method provided in the embodiments of this application. The apparatus 600 may alternatively be an apparatus that can support a network device in implementing a function of the network device in the method provided in the embodiments of this application. The apparatus 600 may be a hardware structure, a software module, or a combination of the hardware structure and the software module. As shown in FIG. 8, the apparatus 600 includes a determining module 601 and a sending module 602. The determining module 601 may be configured to: perform S202 in FIG. 4, and/or perform another step described in this application. The sending module 602 may be configured to: perform S203 in FIG. 4, and/or perform another step described in this application. The determining module may also be referred to as a determining unit or another name, and the receiving module may also be referred to as a receiving unit or another name.

All related content of the steps in the foregoing method embodiment may be cited in function descriptions of corresponding function modules. Details are not described herein again.

In the embodiments of this application, the apparatus 500 or the apparatus 600 may be presented in a form of function modules obtained through division in an integrated manner. The "module" herein may be a specific ASIC, a circuit, a processor executing one or more software or firmware programs, a storage device, an integrated logic circuit, and/or another component that can provide the foregoing functions.

Figure 9:
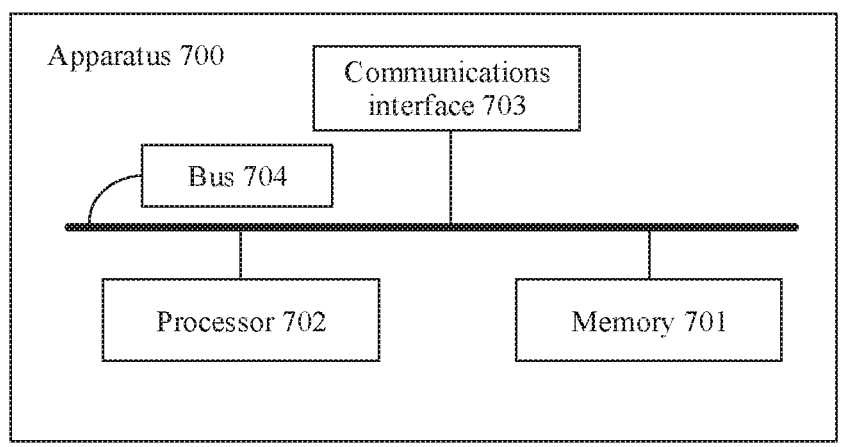
FIG. 9 is a schematic structural diagram of a time domain resource allocation apparatus according to an embodiment of this application.

In a simple embodiment, a person skilled in the art may figure out that the apparatus 500 or the apparatus 600 may be in a form shown in FIG. 9.

As shown in FIG. 9, an apparatus 700 may include a memory 701, a processor 702, and a communications interface 703. The memory 701 is configured to store an instruction; and when the apparatus 700 runs, the processor 702 executes the instruction stored in the memory 701, so that the apparatus 700 is enabled to perform the time domain resource allocation method provided in the embodiments of this application. The memory 701, the processor 702, and the communications interface 703 are connected by using a bus 704. For the specific time domain resource allocation method, refer to the foregoing related descriptions and related descriptions in the accompanying drawings. Details are not described herein again. It should be noted that, in a specific implementation process, the apparatus 700 may further include other hardware components, which are not enumerated one by one in this specification. In a possible implementation, the memory 701 may be included in the processor 702.

In an example of this application, the determining module 501 in FIG. 7 or the determining module 601 in FIG. 8 may be implemented by using the processor 701, and the receiving module 502 in FIG. 7 or the sending module 602 in FIG. 8 may be implemented by using the communications interface 703.

The communications interface 703 may be a circuit, a component, an interface, a bus, a software module, a transceiver, or any other apparatus that can implement communication. The processor 701 may be a field-programmable gate array (FPGA), an application-specific integrated circuit (ASIC), a system on chip (SoC), a central processing unit (CPU), a network processor (NP), a digital signal processing circuit (DSP), or a micro controller (micro controller unit, MCU), or may be a programmable logic device (PLD) or another integrated chip. The memory 701 includes a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories. The memory may alternatively include any other apparatus having a storage function, for example, a circuit, a component, or a software module.

The apparatus provided in the embodiments of this application may be configured to perform the foregoing time domain resource allocation method. Therefore, for technical effects that can be achieved by the apparatus, refer to the foregoing method embodiment. Details are not described herein.

A person of ordinary skill in the art may understand that all or a part of the steps of the method may be implemented by a program instructing related hardware. The program may be stored in a computer-readable storage medium. The computer-readable storage medium may be, for example, a ROM, a RAM, or an optical disc.

An embodiment of this application further provides a storage medium. The storage medium may include a memory 701.

For explanations and beneficial effects of related content in any one of the foregoing provided apparatuses, refer to the corresponding method embodiment provided above. Details are not described herein again.

All or a part of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, clearly, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method, comprising:
   determining N candidate time domain resources that are available for communication of a data channel based on at least one of following: a search space type of a downlink control channel for scheduling the data channel, or a radio network temporary identifier (RNTI) used to perform cyclic redundancy check (CRC) scrambling on the downlink control channel that is for scheduling the data channel, wherein N is greater than or equal to 2, the N candidate time domain resources being indicated by N pieces of candidate time domain resource information, respectively, and each of the N pieces of candidate time domain resource information comprising a mapping type of the data channel, a slot offset $K_0$ indicating a slot in which the data channel is located, a start symbol S of the data channel in the slot, and a symbol length L of the data channel in the slot, wherein the N pieces of candidate time domain resource information comprise at least one of following:
   a mapping type is a type B, $K_0$ is 0, S is 10, and L is 2;
   a mapping type is a type B, $K_0$ is 0, S is 8, and L is 2;
   a mapping type is a type B, $K_0$ is 0, S is 8, and L is 4;
   a mapping type is a type B, $K_0$ is 0, S is 8, and L is 6;
   a mapping type is a type B, $K_0$ is 0, S is 6, and L is 2;
   a mapping type is a type B, $K_0$ is 0, S is 6, and L is 4;
   a mapping type is a type B, $K_0$ is 0, S is 6, and L is 6;
   a mapping type is a type B, $K_0$ is 0, S is 6, and L is 7;
   a mapping type is a type B, $K_0$ is 0, S is 4, and L is 2;

a mapping type is a type B, $K_0$ is 0, S is 4, and L is 4; or
a mapping type is a type B, $K_0$ is 0, s is 4, and L is 6; and
receiving first indication information to determine, from the N candidate time domain resources, a time domain resource allocated to the data channel based on the first indication information.

2. The method according to claim 1, wherein determining the N candidate time domain resources comprises:
determining the N candidate time domain resources when:
CRC scrambling is performed on the downlink control channel for scheduling the data channel, by using a system information radio network temporary identifier (SI-RNTI), a random access radio network temporary identifier (RA-RNTI), a paging radio network temporary identifier (P-RNTI), or a temporary cell radio network temporary identifier (TC-RNTI), or
the CRC scrambling is not performed on the downlink control channel for scheduling the data channel, by using a cell radio network temporary identifier (C-RNTI) or a configured scheduling radio network temporary identifier (CS-RNTI), or
the data channel is scheduled using downlink control information in a format 0_0 or 0_1.

3. An apparatus, comprising a processor and a transceiver, wherein
the processor is configured to determine N candidate time domain resources that are available for communication of a data channel based on at least one of following: a search space type of a downlink control channel for scheduling the data channel, or a radio network temporary identifier (RNTI) used to perform cyclic redundancy check (CRC) scrambling on the downlink control channel that is for scheduling the data channel, wherein N is greater than or equal to 2, the N candidate time domain resources being indicated respectively by N pieces of candidate time domain resource information, and each of the N pieces of candidate time domain resource information comprising a mapping type of the data channel, a slot offset $K_0$ indicating a slot in which the data channel is located, a start symbol S of the data channel in the slot, and a symbol length L of the data channel in the slot, wherein the N pieces of candidate time domain resource information comprise at least one of following:
a mapping type is a type B, $K_0$ is 0, S is 10 and L is 2;
a mapping type is a type B, $K_0$ is 0, S is 8, and L is 2;
a mapping type is a type B, $K_0$ is 0, S is 8, and L is 4;
a mapping type is a type B, $K_0$ is 0, S is 8, and L is 6;
a mapping type is a type B, $K_0$ is 0, S is 6, and L is 2;
a mapping type is a type B, $K_0$ is 0, S is 6, and L is 4;
a mapping type is a type B, $K_0$ is 0, S is 6, and L is 6;
a mapping type is a type B, $K_0$ is 0, S is 6, and L is 7;
a mapping type is a type B, $K_0$ is 0, S is 4, and L is 2;
a mapping type is a type B, $K_0$ is 0, S is 4, and L is 4; or
a mapping type is a type B, $K_0$ is 0, S is 4, and L is 6; and
the transceiver is configured to receive first indication information, wherein the processor is further configured to determine, from the N candidate time domain resources, a time domain resource allocated to the data channel based on the first indication information.

4. The apparatus according to claim 3, wherein the processor is further configured to determine the N candidate time domain resources when:
CRC scrambling is performed on the downlink control channel for scheduling the data channel, by using a system information radio network temporary identifier (SI-RNTI), a random access radio network temporary identifier (RA-RNTI), a paging radio network temporary identifier (P-RNTI), or a temporary cell radio network temporary identifier (TC-RNTI), or
the CRC scrambling is not performed on the downlink control channel for scheduling the data channel, by using a cell radio network temporary identifier (C-RNTI) or a configured scheduling radio network temporary identifier (CS-RNTI); or
the data channel is scheduled using downlink control information in a format 0_0 or 0_1.

5. An apparatus, comprising a processor and a transceiver, wherein
the processor is configured to determine N candidate time domain resources that are available for communication of a data channel based on at least one of following: a search space type of a downlink control channel for scheduling the data channel, or a radio network temporary identifier (RNTI) used to perform cyclic redundancy check (CRC) scrambling on the downlink control channel that is for scheduling the data channel, wherein N is greater than or equal to 2, the N candidate time domain resources being indicated by N pieces of candidate time domain resource information, respectively, and each of the N pieces of candidate time domain resource information comprising a mapping type of the data channel, a slot offset $K_0$ indicating a slot in which the data channel is located, a start symbol S of the data channel in the slot, and a symbol length L of the data channel in the slot, wherein the N pieces of candidate time domain resource information comprise at least one of following:
a mapping type is a type B, $K_0$ is 0, S is 10, and L is 2;
a mapping type is a type B, $K_0$ is 0, S is 8, and L is 2;
a mapping type is a type B, $K_0$ is 0, S is 8, and L is 4;
a mapping type is a type B, $K_0$ is 0, S is 8, and L is 6;
a mapping type is a type B, $K_0$ is 0, S is 6, and L is 2;
a mapping type is a type B, $K_0$ is 0, S is 6, and L is 4;
a mapping type is a type B, $K_0$ is 0, S is 6, and L is 6;
a mapping type is a type B, $K_0$ is 0, S is 6, and L is 7;
a mapping type is a type B, $K_0$ is 0, S is 4, and L is 2;
a mapping type is a type B, $K_0$ is 0, S is 4, and L is 4; or
a mapping type is a type B, $K_0$ is 0, S is 4, and L is 6; and
the transceiver is configured to send first indication information, wherein the first indication information indicates, from the N candidate time domain resources, a time domain resource allocated to the data channel.

6. The apparatus according to claim 5, wherein the processor is further configured to determine the N candidate time domain resources when:
CRC scrambling is performed on the downlink control channel for scheduling the data channel, by using a system information radio network temporary identifier (SI-RNTI), a random access radio network temporary identifier (RA-RNTI), a paging radio network temporary identifier (P-RNTI), or a temporary cell radio network temporary identifier (TC-RNTI), or
the CRC scrambling is not performed on the downlink control channel for scheduling the data channel, by using a cell radio network temporary identifier (C-RNTI) or a configured scheduling radio network temporary identifier (CS-RNTI), or
the data channel is scheduled using downlink control information in a format 0_0 or 0_1.

7. A method, comprising:
determining N candidate time domain resources that are available for communication of a data channel based on at least one of following: a search space type of a downlink control channel for scheduling the data channel, or a radio network temporary identifier (RNTI) used to perform cyclic redundancy check (CRC) scrambling on the downlink control channel that is for scheduling the data channel, wherein N is greater than or equal to 2, the N candidate time domain resources being indicated by N pieces of candidate time domain resource information, respectively, and each of the N pieces of candidate time domain resource information comprising a mapping type of the data channel, a slot offset $K_0$ indicating a slot in which the data channel is located, a start symbol S of the data channel in the slot, and a symbol length L of the data channel in the slot, wherein the N pieces of candidate time domain resource information comprise at least one of following:

a mapping type is a type B, $K_0$ is 0, S is 10, and L is 2;

a mapping type is a type B, $K_0$ is 0, S is 8, and L is 2;
a mapping type is a type B, $K_0$ is 0, S is 8, and L is 4;
a mapping type is a type B, $K_0$ is 0, S is 8, and L is 6;
a mapping type is a type B, $K_0$ is 0, S is 6, and L is 2;
a mapping type is a type B, $K_0$ is 0, S is 6, and L is 4;
a mapping type is a type B, $K_0$ is 0, S is 6, and L is 6;
a mapping type is a type B, $K_0$ is 0, S is 6, and L is 7;
a mapping type is a type B, $K_0$ is 0, S is 4, and L is 2;
a mapping type is a type B, $K_0$ is 0, S is 4, and L is 4; or
a mapping type is a type B, $K_0$ is 0, s is 4, and L is 6; and sending first indication information, wherein the first indication information indicates, from the N candidate time domain resources, a time domain resource allocated to the data channel.

8. The method according to claim 7, wherein determining the N candidate time domain resources comprises:

determining the N candidate time domain resources when:

CRC scrambling is performed on the downlink control channel for scheduling the data channel, by using a system information radio network temporary identifier (SI-RNTI), a random access radio network temporary identifier (RA-RNTI), a paging radio network temporary identifier (P-RNTI), or a temporary cell radio network temporary identifier (TC-RNTI), or the CRC scrambling is not performed on the downlink control channel for scheduling the data channel, by using a cell radio network temporary identifier (C-RNTI) or a configured scheduling radio network temporary identifier (CS-RNTI), or the data channel is scheduled using downlink control information in a format 0_0 or 0_1.

* * * * *

UNITED STATES PATENT AND TRADEMARK OFFICE
CERTIFICATE OF CORRECTION

PATENT NO. : 11,653,337 B2
APPLICATION NO. : 17/037251
DATED : May 16, 2023
INVENTOR(S) : Wang et al.

It is certified that error appears in the above-identified patent and that said Letters Patent is hereby corrected as shown below:

In the Claims

Claim 1, Column 29, Line 2; delete "s" and insert --S--.

Claim 7, Column 32, Line 3; delete "s" and insert --S--.

Signed and Sealed this
Twenty-seventh Day of June, 2023

Katherine Kelly Vidal
*Director of the United States Patent and Trademark Office*